United States Patent [19]
Conley

[11] Patent Number: 5,689,626
[45] Date of Patent: Nov. 18, 1997

[54] SYSTEM AND METHOD FOR LINKING A FILE TO A DOCUMENT AND SELECTING THE FILE

[75] Inventor: Michael T. Conley, Newark, Calif.

[73] Assignee: Apple Computer, Inc., Cupertino, Calif.

[21] Appl. No.: 423,135

[22] Filed: Apr. 17, 1995

[51] Int. Cl.⁶ ........................................ G06K 15/00
[52] U.S. Cl. ............................. 395/117; 395/784
[58] Field of Search ......................... 395/112, 114, 395/115, 116, 117, 148, 149, 650, 600, 766, 767, 768, 769, 779, 784, 785, 786; 382/305, 306; 400/76

[56] References Cited

U.S. PATENT DOCUMENTS

| | | | |
|---|---|---|---|
| 4,470,129 | 9/1984 | Disbrow et al. | 364/900 |
| 5,142,678 | 8/1992 | MacPhail | 395/650 |
| 5,483,651 | 1/1996 | Adams et al. | 395/600 |
| 5,559,933 | 9/1996 | Boswell | 395/115 |
| 5,563,998 | 10/1996 | Yuksich et al. | 395/149 |

*Primary Examiner*—Arthur G. Evans
*Attorney, Agent, or Firm*—Nancy R. Simon

[57] ABSTRACT

A file is selected for use with a document and a file identifier for the selected file is stored in a print record. The file identifier is preferably comprised of a first identifier and a second identifier. If the document with a selected file is saved, the watermark file will "stick" to the document and will be used whenever the document is printed until the file is de-selected or a different file is selected. When the document is printed, the print record is passed to a printer driver. The printer driver selects the proper file by obtaining the first identifier and scanning all of the files for at least one match. If no match is found between the first identifier and the files, an error message is returned. If there is a single match, the document is printed using that file. If there is more than one match, the printer driver obtains the second identifier and scans all of the files again searching for a single match using the first and second identifiers. If there is a single match between the first and second identifiers and a file, the document is printed using that file. When the document is printed, a weighted blending method is used to print a watermark each of the pages in the document. If no match is found or there is more than one match, an error message is returned.

24 Claims, 3 Drawing Sheets

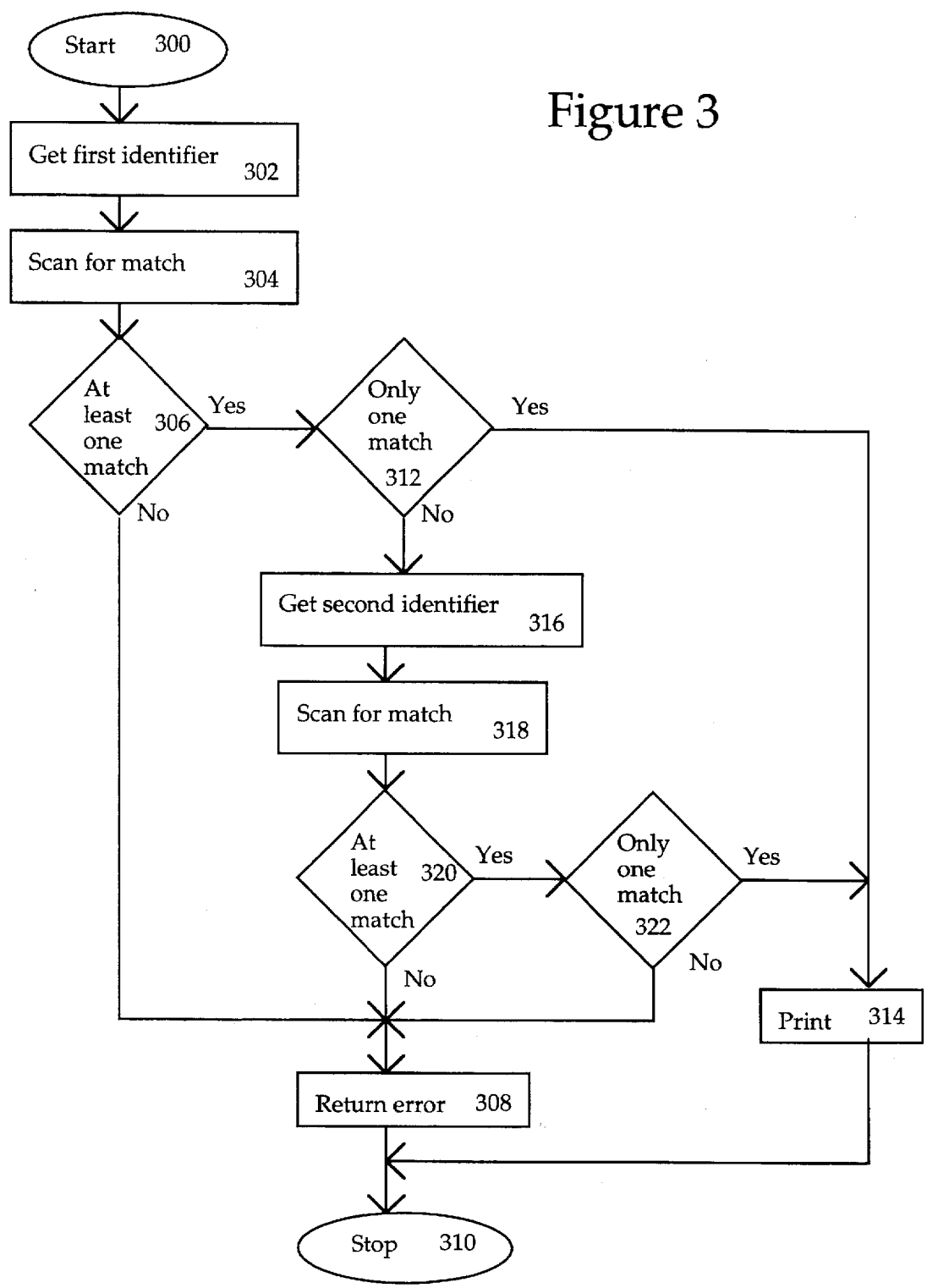

SYSTEM AND METHOD FOR LINKING A FILE TO A DOCUMENT AND SELECTING THE FILE

BACKGROUND OF THE INVENTION

1. Field of the Invention

The present invention relates generally to computer systems, and more particularly to linking one document to another document. Still more particularly, the present invention relates to a system and method for linking a file to a document and selecting the file when the document is to be printed.

2. Description of the Prior Art

There are times when a user would like to use the contents of one file when printing a document. Perhaps there are graphics or text that the user would like to have printed on the pages of the document, but for some reason can not include the graphics or text in the document itself. One such situation can occur with watermarks.

A watermark is a word or image that appears in the background of a printed page. A watermark is typically printed in a light shade of gray so as not to obscure or interfere with the foreground or overlying image. One example of a commonly used watermark is the word "Confidential." Many businesses use a "Confidential" watermark on documents to alert a reader to the confidential nature of the material contained within the document.

Some application programs support a watermark feature. A user selects a watermark and that watermark will be printed on the pages of the document. For example, WordPerfect™ 3.1, from Novell, Inc., supports watermarks. The user can create a watermark or insert a watermark file into a document. The watermark is embedded into the document. Thus, the watermark will be used whenever the document is printed. The user must remove the watermark when he or she no longer wants to use the watermark.

Not all application programs, however, support watermarks. One solution to this problem are programs that compliment non-watermark application programs by providing a means for printing watermarks on pages. For example, a program called "Working Watermarks" from Working Software, Inc., supports watermarks. This program, however, does not link the selected watermark to the document. Also, the watermark will print for any and all documents printed thereafter. To stop using the watermark or to change watermarks the user must de-select the currently selected watermark. Thus, these complimentary programs provide a limited, and often unsatisfying, solution to the problem.

SUMMARY OF THE INVENTION

A file is selected for use with a document and a file identifier for the selected file is stored in a print record. The file identifier is preferably comprised of a first identifier and a second identifier. When the document is to be printed, the print record is passed to a printer driver. The printer driver selects the proper file by obtaining the first identifier and scanning all of the files for at least one match. If no match is found between the first identifier and the files, an error message is returned. If there is a single match, the document is printed using that file.

If there is more than one match, the printer driver obtains the second identifier and scans all of the files again searching for a single match using the first and second identifiers. If there is a single match between the first and second identifiers and the files, the document is printed using that file. If no match is found or there is more than one match, an error message is returned.

If the document with a selected file is saved, the file will "stick" to the document and will be used whenever the document is printed until the file is de-selected or a different file is selected. When the document is printed, a weighted blending method is used to print a watermark each of the pages in the document.

The method for linking the file can be used for purposes other than printing. Another use in the preferred embodiment is to determine which file is currently linked to a document by displaying a pop-up menu in the page setup dialog. In this manner the user can tell which file has been linked to the document.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 3 is a flowchart illustrating a method for selecting a file and using its contents when printing a document according to the present invention.

DESCRIPTION OF THE PREFERRED EMBODIMENT

Figure 1:
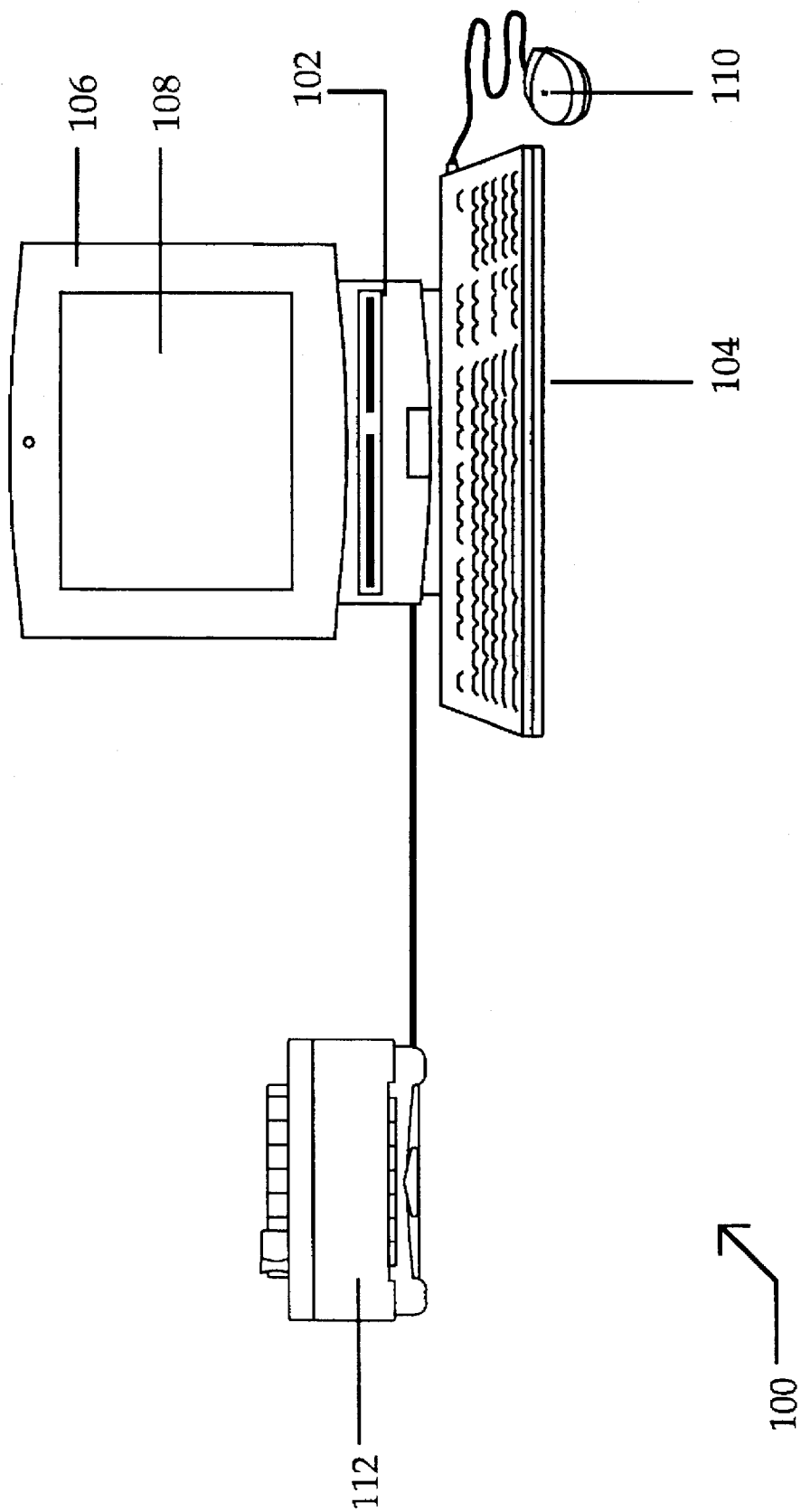
FIG. 1 is a pictorial illustration of a computer system which may be used to implement a method for linking a file to a document and selecting the file according to the present invention.

With reference now to the figures and in particular with reference to FIG. 1, a computer system is illustrated which may be used to implement the method for linking a file to a document and selecting the file according to the present invention. Computer system 100 includes a computer 102, keyboard 104, a monitor 106 having a display screen 108, a cursor control device 110, shown here as a mouse, and a printer 112. Computer system 100 may be implemented using any suitable computer, such as a Macintosh Performa® computer, a product of Apple Computer, Incorporated, located in Cupertino, Calif. Printer 112 may be implemented using any suitable printer, such as a StyleWriter® 1200 printer, also a product of Apple Computer, Incorporated.

Computer system 100 includes a printer driver that corresponds to printer 112. A printer driver is a device driver or an independent software component that the system software in computer 102 uses to convert image data into printed output on printer 112. The term "image" is preferably used to refer to a viewable image, i.e., an image as it is displayed on a display or printed on a page. The printer driver preferably renders images in computer 102 using drawing commands, and then sends the rendered images to printer 112 in the form of pixel maps.

One advantage of having the printer driver control printing is that it introduces greater flexibility into the printing process. The printer driver can examine entire pages for their use of color, fonts, or other objects that need special processing prior to printing. Thus, the method for linking a watermark file to a document and selecting the watermark file when printing the document preferably occurs before the printer driver renders any object on a page.

Figure 2:
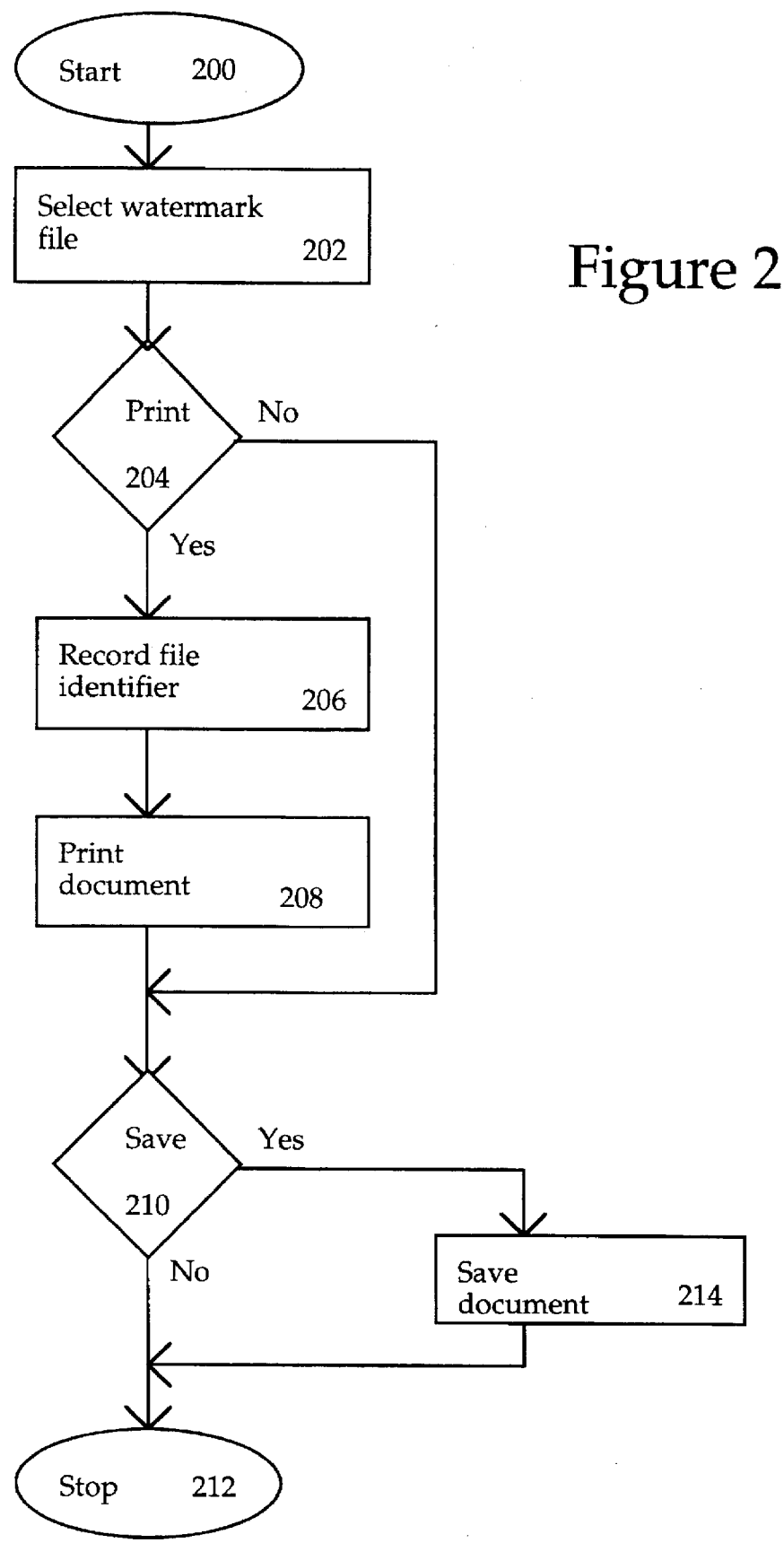
FIG. 2 is a flowchart depicting a method for linking a file to a document according to the present invention.

FIG. 2 is a flowchart depicting a method for linking a file to a document according to the present invention. The method begins at block 200 with an existing folder in computer 102 containing at least one watermark file and a user working on a document in an application program such as MacWrite™. In the preferred embodiment all watermark files are stored at the same location or folder. While working on the document, the user selects a watermark file to use with the document, as shown in block 202. This selection process is preferably accomplished via a dialog box such as page setup. Once the watermark file is selected by the user, a file identifier for that selected watermark file is recorded in the print record associated with the document. This step is illustrated in block 204.

A print record is a data structure associated with a document to be printed that comprises information about the document, such as the name of the document, its resolution, scaling factor, and whether or not the document is in landscape or portrait format. The printer driver can access the information stored in the print record. The print record in the preferred embodiment is a fixed size and can not be enlarged. The present invention, however, can be used with any type of print record.

The file identifier for a watermark file preferably comprises two identifiers, a first identifier and a second identifier. The first identifier is a creation date and the second identifier is a modification date. The creation date is the date in which a watermark file is first created. The creation date is permanent, in that it does not change with subsequent modifications to the file. The modification date is a date in which the watermark file is modified, so it will change with each modification to the file. The creation and modification dates are used as the first and second identifiers in the preferred embodiment because they are usually unique to each watermark file and require small amounts of memory. The creation and modification dates require only four bytes each in the preferred embodiment.

Next, the user decides whether or not to print the document, as depicted in block 206. When a document is to be printed an application program preferably passes the print record to the printer driver. The file identifier will be used by the printer driver to select a watermark file from the folder containing all of the watermark files. The document is then printed, as shown in block 208, with the watermark printed on each page in the document.

Block 210 depicts the next step, in which the user decides whether or not to save the document. If the user does not want to save the document, the process ends at block 212. In this case the watermark file is not linked to the document. In other words, the watermark file will need to be re-selected when the document is printed at a later time.

If the user wants to save the document, the document is saved and the method ends, as shown in blocks 214 and 212, respectively. Saving the document results in having the selected watermark file "stick" to the document. Thus, that watermark file will be used whenever the document is printed until the watermark file is de-selected or a new watermark file is specified. The user does not have to select the watermark file every time he or she wants to print the document with the watermark.

Referring again to block 206, if the user decides not to print the document, the method passes to block 210. Again, if the user does not want to save the document, the process ends at block 212. In this case the watermark is not linked to the document. If the user wants to save the document, the document is saved and the method ends, as shown in blocks 214 and 212, respectively. As discussed earlier, saving the document results in having the selected watermark file "stick" to the document.

Referring to FIG. 3, a flowchart illustrates a method for selecting a file and using its contents when printing a document according to the present invention. The method begins at block 300, with a document having a linked watermark file to be printed. An application program has passed the print record for that document to the printer driver. Next, the printer driver obtains the first identifier from the print record, as shown in block 302. As discussed earlier, the first identifier is preferably the creation date of a watermark file.

After the first identifier is obtained from the print record, the printer driver scans all of the watermark files searching for at least one match between the first identifier and the creation date of all of the watermark files. The printer driver preferably scans all of the files and does not stop when the first match is found. This step is depicted in block 304. A determination is then made as to whether or not at there is at least one match, as shown in block 306. If the search does not find any matches, an error message is returned and the method ends, as shown in blocks 308 and 310, respectively.

In the preferred embodiment, the error message is viewable by the user. The user can correct the error by selecting a different watermark file. This is accomplished in the preferred embodiment by having the user open up the document and select a watermark via a dialog box such as page setup. Other methods can be used, however, to correct the error. For example, a dialog box having a menu of available watermark files can accompany the error message and the user can select a watermark file from the menu.

If the search does find at least one match, the method passes to block 312 where a determination is made as to whether or not there is only one match. If there is only one match between the first identifier and a watermark file, the document is printed using that watermark file. This step is depicted in block 314. The method then ends, as shown in block 310.

If there is more than one match between the first identifier and the watermark files, the printer driver obtains the second identifier from the print record. This step is illustrated in block 316. As discussed earlier, the second identifier is preferably the modification date of a watermark file. The printer driver then scans all of the watermark files searching for at least one match between the first and second identifiers and the creation and modification dates of all of the watermark files. The printer driver preferably scans all of the files and does not stop when the first match is found. This step is depicted in block 318.

A determination is then made as to whether or not at there is at least one match, as shown in block 320. If the search does not find any matches, an error message is returned and the method ends, as illustrated in blocks 308 and 310, respectively. The user can correct the error by either selecting a different watermark file or by modifying the preferred watermark file and re-selecting that watermark file.

If the search does find at least one match, the method passes to block 322 where a determination is made as to whether or not there is only one match. If there is only one match between the first and second identifiers and a watermark file, the document is printed using that watermark file. This step is depicted in block 314. The method then ends, as shown in block 310.

If there is more than one match, an error message is returned and the method ends, as illustrated in blocks 308 and 310, respectively. Again, the user can correct the error by either selecting a different watermark file or by modifying the preferred watermark file and re-selecting that watermark file.

The method for selecting a linked file described with reference to FIG. 3 can be used for purposes other than printing. Another use in the preferred embodiment is to determine which watermark file is currently linked to a document without printing the document. This is accomplished by displaying a watermark pop-up menu in the page setup dialog. In this manner the user can tell which watermark is selected for the document. The same selection method in FIG. 3 is used, and error messages appear at the same places in the method, but the final purpose for selecting the linked file is not to print but to display the chosen file.

When a document is printed with a watermark in the preferred embodiment, the watermark image is blended with the foreground, or overlying, image using a weighted blending. The watermark file contains the watermark image as the user created it, which typically is at full saturation. The user then selects the density of the watermark via a slider in a dialog box in the preferred embodiment. This density value (d) is converted to a blending weight factor (w), and this blending factor is multiplied against the pixel values associated with each pixel in the watermark image. The modified pixels values for the watermark and the pixel values for the overlying image are then added together. The calculations for this weighted blending method are given below.

w=256d/100 where d is the density value, d in [0,100], and w is blending weight factor.

For 32-bit RGB values (24-bit color and 8-bit alpha channel):

$$Rd' = MIN(\sim(((\sim Rs*w)/256) + \sim Rd), 255)$$
$$Gd' = MIN(\sim(((\sim Gs*w)/256) + \sim Gd), 255)$$
$$Bd' = MIN(\sim(((\sim Bs*w)/256) + \sim Bd), 255)$$

where Rd, Gd, Bd are the initial red, green, and blue destination pixel components; Rs, Gs, Bs are the red, green, and glue source pixel components; Rd', Gd', Bd' are the final red, green, and blue destination pixel components; and MIN(a, b) is a maximum function which selects the smaller of a and b.

For 8-bit grayscale values:

D'=MIN(Sw/256+D, 255)

where S is the source pixel value; D is the initial destination pixel value; D' is the final destination pixel value; and MIN(a, b) is a maximum function which selects the smaller of a and b.

Blending is not used for 1-bit images in the preferred embodiment. Instead, the watermark image is copied onto the destination image using an XOR transfer mode.

The weighted blending process described above has the effect of making the watermark transparent to the foreground image. In other words, the watermark image is never obscured by the foreground image except by black areas (e.g. text), and the watermark file never obscures the foreground image except when black areas of the watermark are printed at 100% saturation. The weighted blending process can also have the effect of making the foreground image darker or more saturated.

One advantage to the present invention is that it is performed by the printer driver. An application program does not have to have the capability of supporting watermarks. This means that a watermark file can be linked to a document created by any application program. The application program is not aware of the watermark file. When the document is printed, the printer driver selects the proper watermark file and prints the watermark on the pages in the document.

Another advantage to the present invention is that it can be used with a document containing any type of image or combination of images. In other words, the watermark will print on pages containing text, graphics, photographs, or combinations thereof. Furthermore, the watermark can be any type of image, such as text or graphics and can be printed in black-and-white, grayscale and color.

A third advantage to the present invention is having the watermark file "stick" to a document until the user removes it. Any time the user prints the document the watermark will be printed without having to select the watermark each time.

Finally, another advantage to the present invention is the minimal amount of space needed to link a watermark file to a document. In the preferred embodiment, only eight bytes are required. This is particularly useful when the print record is a fixed size and can not be enlarged.

While the invention has been particularly shown and described with reference to a preferred embodiment, it will be understood by those skilled in the art that various changes in form and detail may be made therein without departing from the spirit and scope of the invention. For example, the present invention can be used with other systems, such as another computer system (i.e., a DOS or Windows system), or another printing system such as a prepress system. Finally, the present invention is not limited to linking a watermark file to a document. The present invention can be used to link any type of document or file to another document.

What is claimed is:

1. A method for associating a file to a document and selecting the file when the document is printed so that the contents of the file are used when the document is printed, the method comprising the steps of:

providing a means for selecting a file containing data to be used when the document is printed;

storing a file identifier in a print record associated with the document after the file is selected, wherein the file identifier is comprised of a first identifier and a second identifier;

retrieving the first identifier from the print record when the document is to be printed;

selecting the file by searching all files for at least one match using the first identifier when the document is to be printed;

if only one match occurs when searching all files using the first identifier, using the contents of the matching file when printing the document;

if more than one match occurs when searching all flies using the first identifier, retrieving the second identifier from the print record;

searching all files for only one match using the first identifier and the second identifier;

if only one match occurs when searching all files using the first identifier and the second identifier, using the contents of the matching file when printing the document; and if more than one match occurs when searching all files using the first identifier and the second identifier, returning an error message because the selected file can not be found.

2. The method of claim 1, further comprising the step of saving the document with the file associated with it, whereby the file is linked to the document and the contents of the file will be used whenever the document is printed until the file is unlinked from the document.

3. The method of claim 1, further comprising the step of returning an error message when there is no match after searching all files for at least one match using the first identifier.

4. The method of claim 1, wherein the step of providing a means for selecting a file comprises a menu within a dialog box.

5. The method of claim 1, wherein the file comprises a watermark file.

6. The method of claim 5, wherein the first identifier is a creation date of the watermark file and the second identifier is a modification date of the watermark file.

7. A printer driver for selecting a file that has been associated with a document, wherein the contents of the file are used when the document is printed, the printer driver comprising:

means for retrieving a first identifier from a print record associated with the document when the document is to be printed, wherein the file has at least a first identifier and a second identifier associated with it;

means for selecting the file by searching all files for at least one match using the first identifier;

if only one match occurs when searching all files using the first identifier, using the contents of the file when printing the document;

if more than one match occurs when searching all files using the first identifier, means for retrieving the second identifier from the print record associated with the document;

means for searching all files for only one match using the first identifier and the second identifier;

if a only one match occurs when searching all files using the first identifier and the second identifier, using the contents of the file when printing the document; and if more than one match occurs when searching all files using the first identifier and the second identifier, means for returning an error message because the selected file can not be found.

8. The printer driver of claim 7, further comprising means for returning an error message when there is no match after searching all files for at least one match using the first identifier.

9. The printer driver of claim 7, wherein the means for using the contents of the file when printing the document comprises means for performing a weighted blending of the pixel values.

10. The printer driver of claim 7, wherein the step of providing a means for selecting a file comprises a menu within a dialog box.

11. The printer driver of claim 7, wherein the file comprises a watermark file.

12. The printer driver of claim 11, wherein the first identifier is a creation date of the watermark file and the second identifier is a modification date of the watermark file.

13. A system for selecting a file that has been associated with a document, wherein the contents of the file are used when the document is printed, the system comprising:

means for retrieving a first identifier from a print record associated with the document when the document is to be printed, wherein the file has at least a first identifier and a second identifier associated with it;

means for selecting the file by searching all files for at least one match using the first identifier when the document is to be printed;

if only one match occurs when searching all files using the first identifier, means for using the contents of the file when printing the document;

if more than one match occurs when searching all files using the first identifier, means for retrieving the second identifier from the print record associated with the document;

means for searching all files for only one match using the first identifier and the second identifier;

if only one match occurs when searching all files using the first identifier and the second identifier, means for using the contents of the file when printing the document; and if more than one match occurs when searching all files using the first identifier and the second identifier, means for returning an error message because the selected file can not be found.

14. The system of claim 13, further comprising means for returning an error message when there is no match after searching all files for at least one match using the first identifier.

15. The system of claim 13, wherein the means for using the contents of the file when printing the document comprises means for performing a weighted blending of the pixel values.

16. The system of claim 13, wherein the step of providing a means for selecting a file comprises a menu within a dialog box.

17. The system of claim 13, wherein the file comprises a watermark file.

18. The system of claim 17, wherein the first identifier is a creation date of the watermark file and the second identifier is a modification date of the watermark file.

19. A system for associating a file to a document and selecting the file when the document is printed so that the contents of the file can be used when the document is printed, the system comprising:

means for selecting a file containing data to be used when printing the document;

means for storing a file identifier in a print record associated with the document after the file is selected, wherein the file identifier is comprised of a first identifier and a second identifier;

means for retrieving the first identifier from the print record associated with the document when the document is to be printed;

means for selecting the file by searching all files for at least one match using the first identifier when the document is to be printed;

if only one match occurs when searching all files using fie first identifier, means for using the contents of the file when printing the document;

if more than one match occurs when searching all files using the first identifier, means for retrieving the second identifier from the print record associated with the document;

means for searching all files for only one match using the first identifier and the second identifier;

if only one match occurs when searching all files using the first identifier and the second identifier, means for using the contents of the file when printing the document; and if more than one match occurs when searching all files using the first identifier and the second identifier, means for returning an error message because the selected file can not be found.

20. The system of claim 19, further comprising means for saving the document with the file associated with it, whereby the file is linked to the document and the contents of the file will be used whenever the document is printed until the file is unlinked from the document.

21. The system of claim 19, further comprising means for returning an error message when there is no match after searching all files for at least one match using the first identifier.

22. The system of claim 19, wherein the means for selecting a file comprises a menu within a dialog box.

23. The method of claim 19, wherein the file comprises a watermark file.

24. The method of claim 23, wherein the first identifier is a creation date of the watermark file and the second identifier is a modification date of the watermark file.

* * * * *

UNITED STATES PATENT AND TRADEMARK OFFICE
CERTIFICATE OF CORRECTION

PATENT NO. : 5,689,626
DATED : November 18, 1997
INVENTOR(S) : Conley It is certified that error appears in the above-identified patent and that said Letters Patent is hereby corrected as shown below:

In the claims:

Claim 1, Column 6, line 54, please delete "flies" and replace it with - -files- -.
Claim 19, Column 8, line 49, please delete "tie" and replace it with -- the --.

Signed and Sealed this

Sixth Day of July, 1999

Attest:

Q. TODD DICKINSON

*Attesting Officer*     *Acting Commissioner of Patents and Trademarks*